Patented June 28, 1932

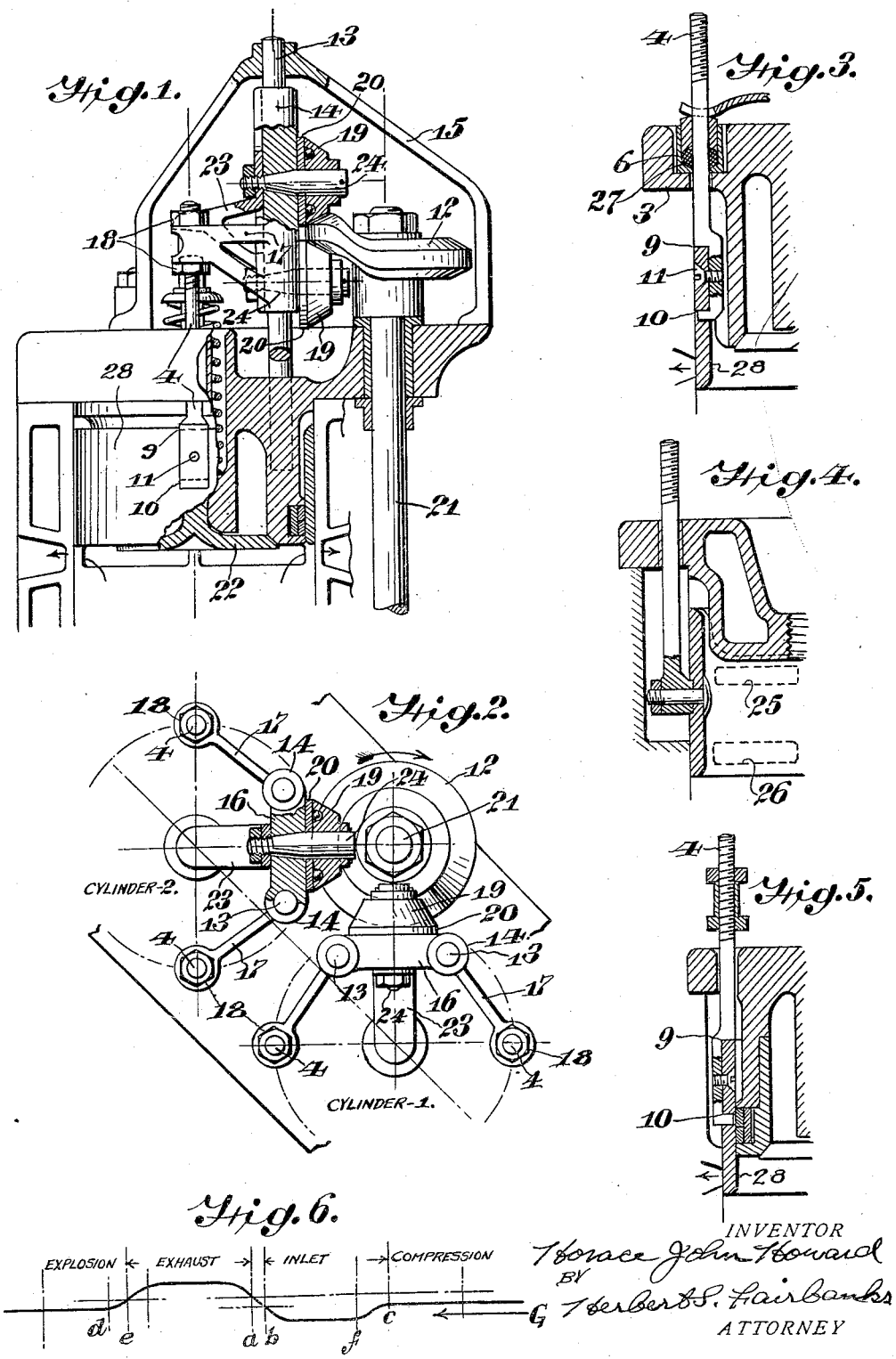

1,864,735

UNITED STATES PATENT OFFICE

HORACE JOHN HOWARD, OF SOUTHPORT, ENGLAND

VALVE OPERATING MECHANISM FOR INTERNAL COMBUSTION ENGINES

Application filed January 13, 1927, Serial No. 161,013, and in Great Britain January 15, 1926.

This invention relates to internal combustion engines of the type wherein a comparatively narrow split ring is used to control exhaust ports only or both exhaust and inlet ports cut through the upper part of the cylinder wall, and operating above the piston in an annulus formed by a deeply recessed head and the cylinder wall.

It has for its objects:—To provide a cam mechanism acting direct on the valves without the intervention of any rocking joints, resisting angular thrust and transmitting only axial motion to the valves. A mechanism that can be conveniently arranged to operate all the ports of two adjacent cylinders employing one cam only. A simple and effective means of attaching operating rods rigidly to a slide valve without the use of lugs formed on the valve edge. A means for preventing leakage of gas where said rods operate through a cylinder head without restraining the freedom of the valve they operate. A method of operating a centrally placed inlet valve by the downward movement of the operating mechanism.

Referring to the accompanying drawing, Fig. 1 shows in part sectional assembly the combination of a disc cam, sliding frame with rollers, slide exhaust ring valve with its connection, and central inlet valve. Fig. 2 is a top plan of same showing method of resisting angular thrust on rollers, and the method of operating all the valves of two adjacent cylinders whose cranks are at 180 degrees. Fig. 3 is a section through one operating rod showing the method of attachment to the inside of a ring valve operating exhaust ports, also the construction of the floating packing gland used in conjunction therewith. Fig. 4 shows an alternative method of using the sliding frame and cam to operate a slide valve for exhaust and inlet, dispensing with the glands, the central inlet, and the packing ring on the head. Fig. 5 shows the new method of rod attachment but applied to the outside of a valve whose inside surface works over a packing ring to seal the combustion chamber, the inlet in this case being by way of a central poppet valve not shown. Fig. 6 shows the path of the slide valve and the port opening in relation to piston strokes.

The operation of a split ring has been accomplished in the past by means of pins projecting through slots in the cylinder wall, said slots being sealed by the valve itself, the objection to this method is that with a light ring, heavy reciprocation tends to spring the valve from its seating and cause breakage, also a ported valve has used lugs formed on the valve itself to connect to its actuation parts, both these methods are open to the objection that they form two points of extra stiffness at the lugs or bosses, whereas the present invention aims at the use of a plain tubular ring of equal flexibility throughout its circumference, also the operating power is applied direct to the edge of the valve without overhang or side strain.

The valve 28 shown in Figs. 1, 3 and 5 operates exhaust ports only by their lower edge, the inlet being by way of a poppet valve centrally placed. In Fig. 4, the inlet is by way of ports operated by the upper edge of the valve.

The sealing of the combustion chamber in Figs. 3 and 4, is by joining at 3 and the glands round the rods, but in Figs. 1 and 5 the sealing is by the packing ring or rings within the valve, and carried by the sunk head, the actuation rods in this case require no glands. It will be seen that with an elastic valve the actuation rods must be free to allow the valve its proper expansion and freedom of movement, therefore a type of gland is necessary that in no way restricts this freedom, and I propose to hold an asbestos packing 27 between two countersunk washers 6 closely fitting the rod 4 but loosely fitting their housings, the rods themselves loosely fitting the cylinder head and the gland. It will be seen that this gland consists of two telescoping members 6 between which the asbestos packing 27 is disposed.

The method of attaching the rods to the valves, herein proposed is to mill a keyway 10 about midway in the side of the valve, and to turn the ends of the rods in a jig to fit the keyway and at the same time the top edge of the valve, so that a substantial portion of the valve is gripped between points 9 and 10, being secured thereto by a screw or rivet 11.

These rods receive the required movement from a cam 12, by means of a frame 14 sliding on two rigid parallel rods 13 fixed in the cylinder head as shown in Fig. 1, or they can be fixed in the cylinder top, their upper ends being conveniently held by a cover 15 or other means. The frame 14 consists of two parallel tubes joined by bridges 16 to which the roller pins 24 are attached, arms 17 project from the sides spread to register with the valve rods 4, 4 the ends of the arms form eyes which are a loose fit on the valve rods, to give the same freedom that the glands 7 give, nuts or collars 18 screwing on the valve rods rest above and below these eyes to convey the motion from the arms to the valve.

The two rollers 19 between which the cam runs are preferably coned to avoid slip, and have a groove in their backs to carry a row of balls which press against a hard washer 20 to receive the end thrust of such a cam, this also allows the rollers to be adjusted to the cam edge, by changing the thickness of the washers. The cam 12 is driven by a vertical shaft 21 or other convenient means, and when used on a four cylinder engine can be located as shown in Fig. 2 between the two first cylinders whose sequence of firing is 90 deg. on the cam shaft, the two rear cylinders being driven by a cam revolving in the reverse directions. The centrally placed inlet valve 22 is conveniently opened by a short arm 23 carried by the roller pins 24, for this purpose the slide valve travels the path indicated in Fig. 6 where it will be seen that after closing the exhaust ports at $a$, Figure 6 it travels the overlap or seal to $b$, when the arm 23 contacts with the stem of the valve 22 and opens same, the slide valve descending over the oily cylinder wall for this purpose, with advantage to its lubrication it rises again from $f$ to $c$, where the valves remain closed and at rest till point $d$ is reached, when the slide begins to move upward opening the exhaust ports at C. The same cam movements can be used to pass the top edge of the valve across a set of inlet ports 25, Fig. 4, dispensing with the central inlet valve. The slightly later inlet opening has no detrimental effect in view of the large port area that can be provided.

In Fig. 4, the ignition plug can be placed in the sunk head, whereas in the other designs it is best placed on the side of the cylinder with a short passage leading through the cylinder to a point just above the highest point of the piston and below the neutral position of the valve, preferably at the base of the split. It is advisable to keep the arms of the sliding frame as short as possible hence the guide rods 13 are shown rooted in the cylinder head within the bore. This construction enables the whole valve mechanism to be removed with the cylinder head, the cam being keyed or splined for the purpose.

What I claim as my invention and desire to secure by Letters Patent is:—

1. In valve controlling mechanism for an internal combustion engine, the combination with the engine cylinder having exhaust ports in its periphery, of a reentrant, cylinder head, a valve controlling said exhaust ports and slidable between said cylinder head and engine cylinder, stems for said valve, an inlet port opening through the end of said cylinder head, a valve controlling said port, a frame guided in a rectilinear path, having an arm to effect the opening movement of said inlet valve and provided with arms fixedly connected with the stems of said exhaust valve, and a cam to reciprocate said frame.

2. In valve controlling mechanism for an internal combustion engine, the combination with the engine cylinder having circumferentially arranged exhaust ports and a reentrant cylinder head, of an exhaust valve slidable between said cylinder head and the wall of the engine cylinder, a frame guided to travel in a rectilinear path and provided with arms, a plurality of stems for the exhaust valve rigidly connected with said arms, anti-friction devices on said frame, and a disc cam revoluble between said anti-friction devices to effect the reciprocatory movement of said frame.

3. In valve controlling mechanism for an internal combustion engine, comprising a tubular ring of equal flexibility throughout its circumference, and a valve stem applying its power in one direction directly to the edge of the valve, and having a lug keyed to the valve to effect its movement in the opposite direction.

4. In valve controlling mechanism for an internal combustion engine, a tubular valve, actuating stems connected with said valve and guided to move in a rectilinear path, each of said valve stems having a shoulder overhanging one edge of the valve and having its inner end keyed to the valve, and fastening means to secure the valve stem and valve in assembled condition.

5. In valve controlling mechanism for an internal combustion engine, the combination with an engine cylinder having circumferentially disposed exhaust ports, and a reentrant cylinder head having an inlet port through it, of a tubular exhaust valve slidable between the cylinder head and the walls of the cylinder, a spring pressed inlet valve closing said inlet port, a frame mounted on said cylinder to move in a rectilinear path and having an arm to operate said inlet valve, and having a plurality of arms, a pair of stems for said exhaust valve directly and rigidly connected with said arms, spaced anti-friction rollers carried by said frame, a cam adapted to travel between said rollers to reciprocate said frame, and a shaft for driving said cam and disposed longitudinally of the engine cylinder.

6. In valve controlling mechanism for an internal combustion engine, a poppet valve at the extreme end of the engine cylinder controlling the introduction of fuel, circumferentially disposed exhaust ports in proximity to said poppet valve, a sleeve valve controlling said exhaust ports, and a cam actuated reciprocatory frame controlling said valves and movable in a rectilinear path.

In testimony whereof I affix my signature.

HORACE JOHN HOWARD.